Aug. 3, 1954  S. H. BERCH ET AL  2,685,176
APPARATUS FOR PRACTICING CONTINUOUS REFRIGERATION
Filed July 5, 1950  10 Sheets-Sheet 3

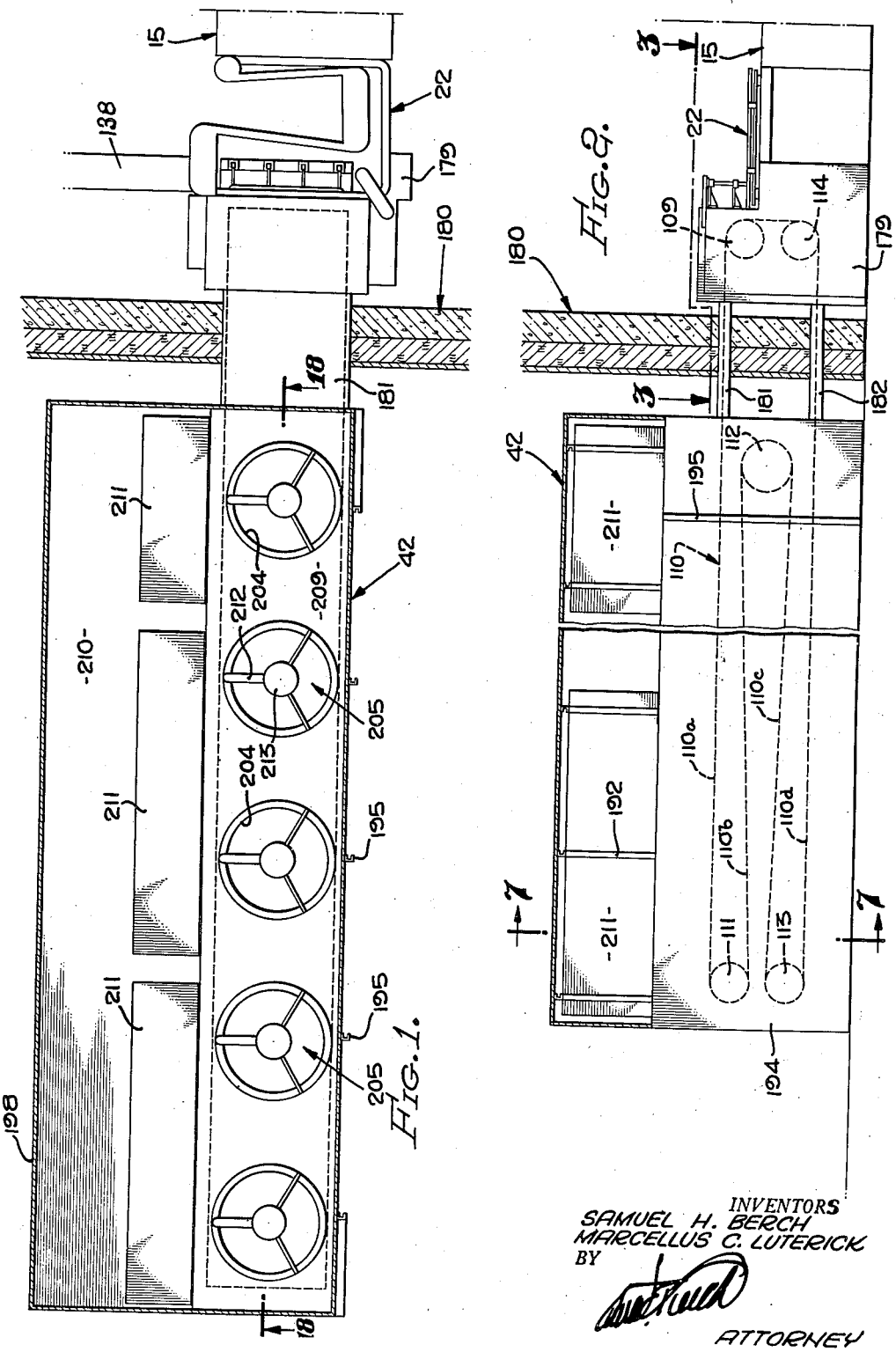

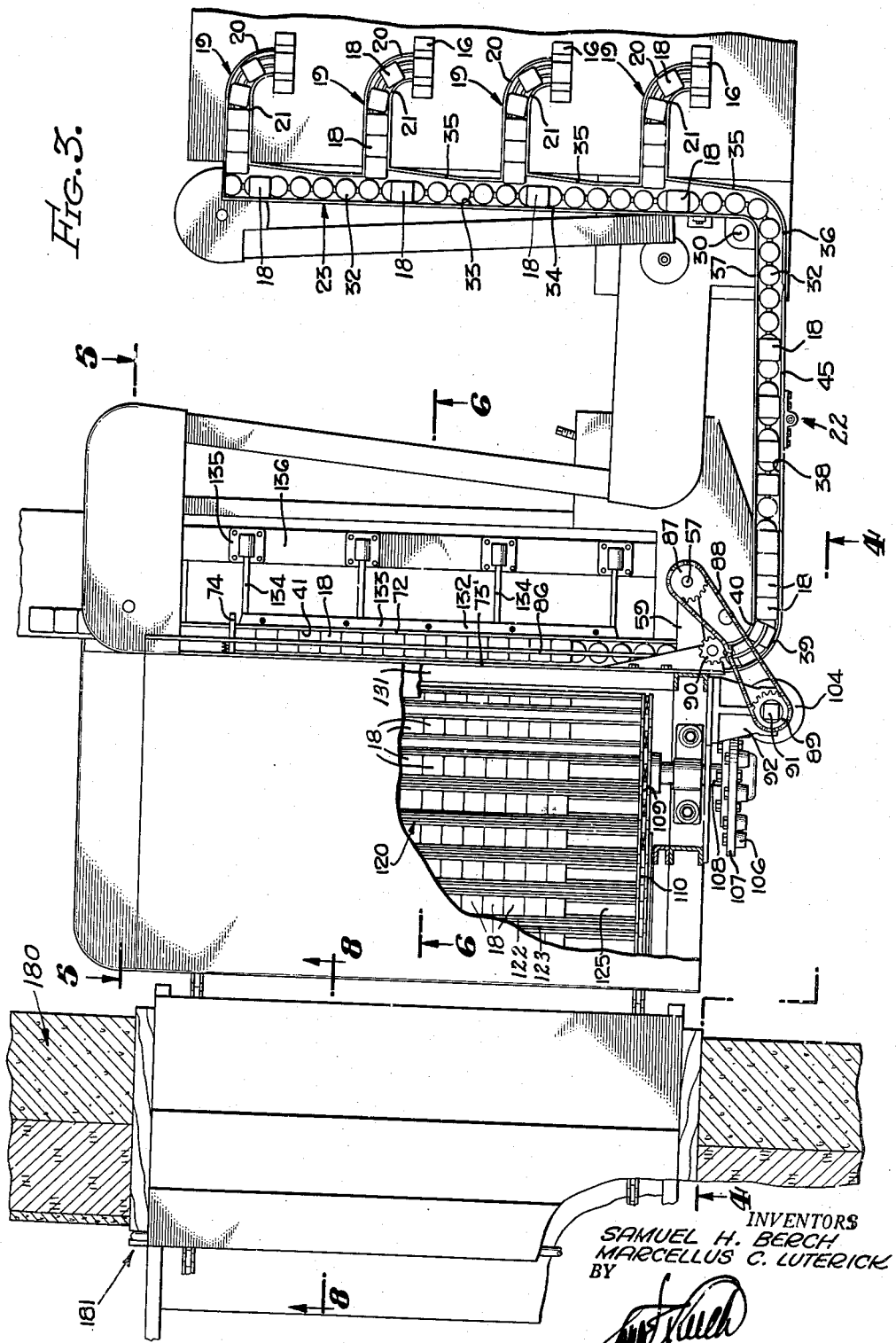

INVENTORS
SAMUEL H. BERCH
MARCELLUS C. LUTERICK
BY
ATTORNEY

Aug. 3, 1954     S. H. BERCH ET AL     2,685,176
APPARATUS FOR PRACTICING CONTINUOUS REFRIGERATION
Filed July 5, 1950     10 Sheets-Sheet 4

INVENTORS
SAMUEL H. BERCH
MARCELLUS C. LUTERICK
BY

ATTORNEY

Aug. 3, 1954  S. H. BERCH ET AL  2,685,176
APPARATUS FOR PRACTICING CONTINUOUS REFRIGERATION
Filed July 5, 1950  10 Sheets-Sheet 6

INVENTORS
SAMUEL H. BERCH
MARCELLUS C. LUTERICK
BY
ATTORNEY

Aug. 3, 1954 S. H. BERCH ET AL 2,685,176
APPARATUS FOR PRACTICING CONTINUOUS REFRIGERATION
Filed July 5, 1950 10 Sheets-Sheet 7

INVENTORS
SAMUEL H. BERCH
MARCELLUS C. LUTERICK
BY
ATTORNEY

INVENTORS
SAMUEL H. BERCH
MARCELLUS C. LUTERICK
BY
ATTORNEY

Aug. 3, 1954 S. H. BERCH ET AL 2,685,176
APPARATUS FOR PRACTICING CONTINUOUS REFRIGERATION
Filed July 5, 1950 10 Sheets-Sheet 9

INVENTORS
SAMUEL H. BERCH
MARCELLUS C. LUTERICK
BY
ATTORNEY

Aug. 3, 1954     S. H. BERCH ET AL     2,685,176
APPARATUS FOR PRACTICING CONTINUOUS REFRIGERATION
Filed July 5, 1950     10 Sheets-Sheet 10

INVENTORS
SAMUEL H. BERCH
MARCELLUS C. LUTERICK
BY
ATTORNEY

Patented Aug. 3, 1954

2,685,176

UNITED STATES PATENT OFFICE 2,685,176

APPARATUS FOR PRACTICING CONTINUOUS REFRIGERATION

Samuel H. Berch, Beverly Hills, and Marcellus C. Luterick, Montrose, Calif., assignors, by mesne assignments, to Diced Cream of America Co., Los Angeles, Calif., a corporation of Delaware Application July 5, 1950, Serial No. 172,113

6 Claims. (Cl. 62—114)

This invention relates to methods of refrigeration and particularly pertains to apparatus for practicing continuous refrigeration.

In the continuous refrigeration of food products, and particularly ice cream, it is desirable to pass a refrigerated product through a zone of refrigeration at a maximum high speed without over-freezing the surface area of the product or while creating a desired temperature entirely through the product. If the exterior of the product is given a relatively low temperature, the quality of the product itself will be impaired and furthermore an outer casing of ice crystals may form which are wholly undesirable, particularly when refrigerating packaged ice cream. If, on the other hand, the center or core of a food product and particularly a mass of ice cream has not been lowered in temperature sufficiently, the product will be unstable and the taste of the product will not be uniform.

In connection with the present problem it is desirable to provide a method and means of continuously refrigerating ice cream filled and packaged in cartons disclosed in U. S. Letters Patent No. 2,443,530 entitled Carton for Ice Cream and the Like; No. 2,443,531 entitled Carton for Food Products; also U. S. Patent No. 2,500,922 entitled Container Flap Folding Apparatus and U. S. pending applications, Serial No. 748,203, filed May 15, 1947, now Patent No. 2,550,903, May 1, 1951, entitled Material Measuring and Dispensing Device and Serial No. 93,497 filed May 16, 1949, now abandoned, entitled Sheet Feeding Device; the present means being designed to receive the cartons immediately after they are filled and closed and the present method involving the continuous conveying and refrigeration of the ice cream or other food product in packaged cartons by a combined refrigeration process of conduction and convection in the refrigerating operation.

The ice cream cartons are formed, filled and closed by a machine such as shown in the U. S. patents and co-pending applications as above mentioned.

In the operation of this machine it is the practice to deliver ice cream from a suitable ice cream mixing machine and to the machine through a conduit and under pressure, the ice cream being in a semi-fluid state when introduced into a formed and opened carton. After the carton has been closed it is necessary to move the closed cartons into a refrigeration unit and handle the cartons in a controlled manner to insure that the time of travel of the carton through the refrigeration unit is maintained at a critical speed of travel while being subjected to a refrigeration action by conduction and convection at a predetermined critical temperature. It is the principal object of the present invention therefore to provide a method and means of receiving filled cartons of ice cream or other products requiring critical refrigeration and conducting the filled cartons through a refrigeration unit at a speed of travel and at a temperature to insure that a product of uniform quality, taste and texture is produced.

The present invention contemplates the provision of a freezing tunnel and conveying mechanism passing therethrough said conveying mechanism being associated with a timing structure whereby articles to be refrigerated are collected and placed on the conveying mechanism in groups to insure a maximum capacity of the machine and to insure also that the products will be conveyed through the machine and subjected to a temperature which will cause the temperature of a product to be lowered to a desired uniform degree both as to its interior mass and the surface area.

The invention is illustrated by way of example in the accompanying drawings in which:

Figure 1 is a view in plan showing the freezing tunnel and indicating in elevation the feeding and timing mechanism.

Fig. 2 is a side elevational view showing the structure illustrated in Fig. 1 and indicating the relationship of this structure to a heat insulating partition wall.

Fig. 3 is an enlarged view in horizontal section as seen on the line 3—3 of Fig. 2 and shows the timing and feeding mechanism which is interposed between a carton forming and filling stucture and the freezing tunnel.

General structure

Figure 20:
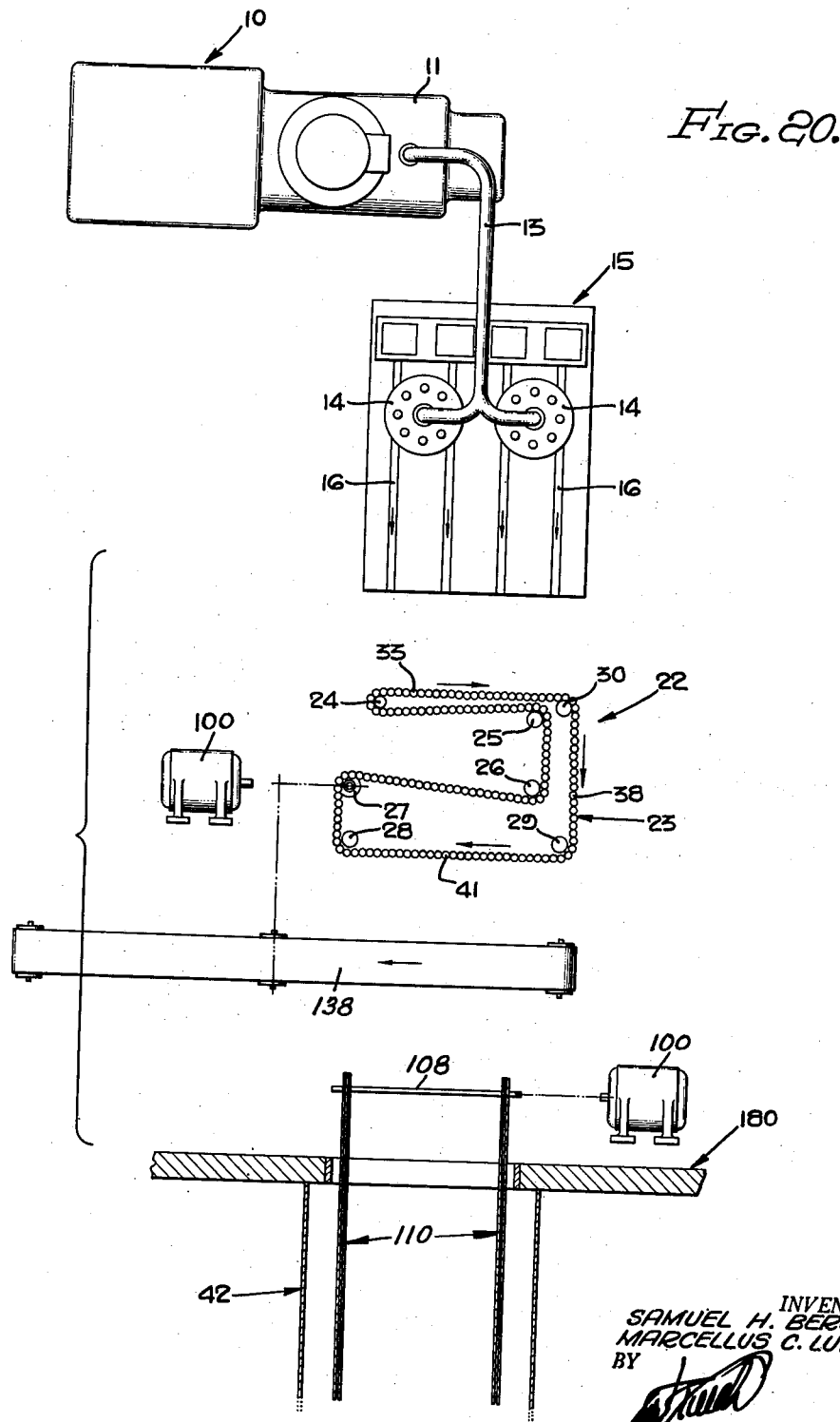
Fig. 20 is an enlarged diagrammatic view showing the present invention and the associated structures whereby ice cream is made, cartons filled therewith and said cartons then carried through the freezing or hardening tunnel and thereafter discharged.

Referring more particularly to Fig. 20 of the drawings, 10 indicates an ice cream freezing unit. It is to be understood that the present invention might be profitably employed in refrigerating other types of food than ice cream but in view of the fact that the invention is particularly efficient in providing a method for the proper freezing or hardening of ice cream in cartons the present application discloses the invention in this connection.

The freezer 10 prepares ice cream in a semisolid or fluid condition so that the ice cream may be forced by a pumping mechanism 11 into a conduit 13. This conduit leads to distributing heads 14 within which the ice cream is measured as to quantity and is then discharged into containers which are formed and placed at discharge stations.

A structure embodying measuring and filling mechanism as shown in the co-pending applications as identified in the foregoing, the structure generally is indicated at 15 in Fig. 20 of the drawings and for present purposes will be hereinafter called a "filler." The filler in this particular case is provided with the four conveyor lines indicated at 16 which carry the filled cartons or containers away from the conveying stations as generally indicated at 14.

Referring particularly to Fig. 3 of the drawings, it will be seen that the filled and closed cartons 18 are discharged from the conveyor onto a carton run 19 which comprises a pair of spaced guide elements 20 and 21 angular in section; these lead the cartons away from the filler and to an intermediate timing and feeding mechanism as generally indicated at 22 in Fig. 20 of the drawings. A part of the intermediate feeding and timing structure 22 comprises an endless conveyor unit 23 which is shown diagrammatically in Fig. 20 as being led around sprockets 24, 25, 26, 27, 28, 29 and 30.

Figure 10:
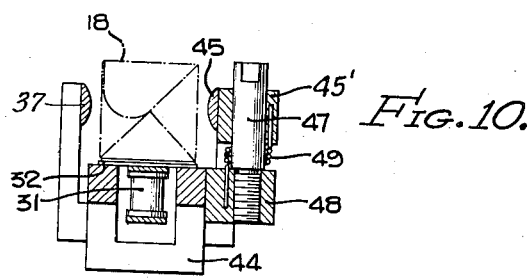
Fig. 10 is a view in vertical section as seen on the line 10—10 of Fig. 9 and shows the mounting for the emergency gate.

By reference to Figs. 3 and 10 of the drawings it will be seen that the endless conveyor unit 23 comprises a chain 31 which leads around the sprockets and upon alternate lengths of which chain discs 32 are secured. These discs provide a relatively smooth surface upon which the cartons 18 may rest. However, sufficient friction occurs between the surface of the cartons and the disc to insure that under normal conditions the cartons will travel with the conveyor chain. In certain operations of the machine the travel of the cartons is interrupted and the conveyor chain 31 thereafter continues its travel beneath the cartons without placing any excessive load upon the driving mechanism.

Timing structure

The timing of the conveyor chain 31 and the delivery of cartons from the discharge conveyor 16 is such that four cartons 18 are simultaneously delivered to the straight run 33 of the conveyor chain 31 which run is at right angles to and in the same horizontal plane with the discharge runs 19 leading from the filler 15. Thus, the cartons will be placed upon the conveyor run 33 at spaced intervals as determined by the spacing between the discharge runs 19 in the filler. Disposed just above and on opposite sides of the length of feed chain 31 forming the run 33 is a straight vertical wall 34 and obliquely disposed walls 35, the latter being located just in advance of the respective runs 19. The oblique walls 35 guide the cartons discharged from the runs 19 onto the discs 32 of the chain 31 so that these cartons are carried on said discs close to wall 34. The advance end of the wall 34 and the final oblique wall 35 are bent concentrically with the axis of the sprocket 30 and merge into spaced straight walls 36 and 37 located on opposite sides of a chain run 38 which lies between the sprocket 30 and sprocket 29.

The walls 36 and 37 terminate in arcuate wall sections 39 and 40 which are formed concentrically with the sprocket 29 and extend therefrom in straight parallel relation along opposite sides of a run 41 of the chain 31.

Feeding unit

A timing structure is associated with the feeding unit in order to accumulate a desired number of cartons in an aligned group with side faces abutting after which a group of cartons thus arranged are delivered to a freezing tunnel generally indicated at 42 in Fig. 20 of the drawings and which tunnel is disposed upon the opposite side of a wall from the position occupied by the feeding and timing mechanism.

Figure 9:
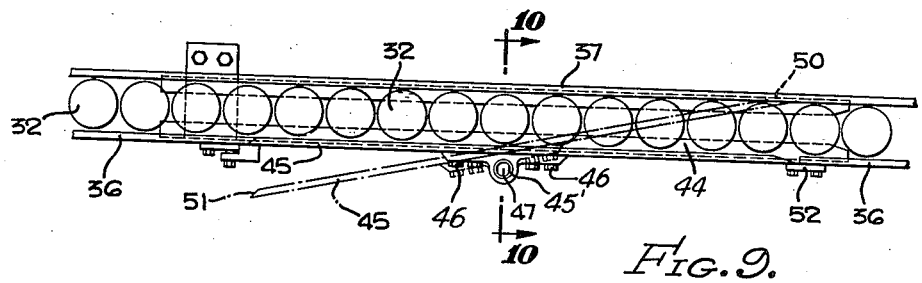
Fig. 9 is an enlarged fragmentary plan view of a portion of Fig. 3 illustrating an emergency gate for diverting cartons from a runway along which these are being delivered to a mechanism for feeding said cartons to the freezing conveyor.

It may occur that in accumulating the cartons to form a group to be transferred into the freezing tunnel that a carton may jam or that it becomes necessary to divert cartons from the feed chain 31 and to prevent cartons from entering the freezing tunnel 42. An emergency gate has therefore been provided as shown in Fig. 9 of the drawing. Here it will be seen that at a point along the length of run 38 of the feed conveyor chain 31 a channel shape guide track 44 accommodates the chain and also permits a chain disc 32 to rest upon the upper surface thereof. A guide track carries the vertical side wall 37 of the carton guide run along one side and bridges a gap in the length of the wall 36 as particularly shown in Fig. 9.

Emergency gate

The interrupted vertical wall section 36 is supplemented by a swinging safety gate 45 indicated in Fig. 9 of the drawings. This gate is fitted with a horizontally extending bearing bracket 45' which is secured to the gate mid-way of its length by cap screws 46, extending through the bearing portion of the bracket 45' is a pivot pin 47 which at its lower end is threaded into a lug 48 carried upon the side of the guide track 44. Wound around the pivot pin 47 is a spring 49 which normally holds the supplemental wall section 45 in longitudinal alignment with the wall section 36, one end of the spring being fixed to the lug 48 and the other end being fixed to the bracket 45'. The ends of the supplemental wall section 45 are tapered as indicated at 50 and 51 in Fig. 9 of the drawings. The taper is such as to cause the tapered face to rest flat against the inner face of the vertical wall 37 when the member 45 is in its emergency open position. This will cause the cartons to be diverted from the conveyor chain so that they may be caught in a container or move onto an adjacent table. One end of the wall section 36, adjacent the gap therein, is provided with a stop plate 52 so that when the emergency wall section 50 swings into normal alignment with wall 36, the point of the wall will encounter the stop plate 52 and will be held in position thereagainst by the tension of the coil spring 49. The opposite end 51 of the gate 45 moves against a supplemental tapered face on the end of the wall section 36 so that a smooth guide surface will be provided.

Group timing mechanism

It is intended that the filled cartons 18 shall be delivered to buckets carried on endless conveyors within the hardening tunnel 42 and that the buckets shall extend horizontally and have a capacity of sixteen cartons per bucket so that a large number of packages may be hardened in a relatively small space of time. In order to fill the individual buckets and to cause the cartons to assume an aligned position in close contact with each other, a stop and timing mechanism 53 is provided as particularly shown in Figs. 3 and 12 of the drawings.

This mechanism comprises a sliding head 54 formed with parallel rails 55 and 56. These rails straddle a vertical cam shaft 57 and are held together by fastening plates 58 which are secured to a frame plate 59 of the machine. The opposite ends of the rails 55 and 56 are secured together with a tie-bar 60 and space is thus afforded between the rails 55 and 56 and between the tie-bar 60 and the frame plate 59 to accommodate a follower bar 61. The follower bar 61 is fitted at its outer end with a plate 62 which receives cap screws 63 extending through openings in the plate 62 and engaging a presser plate 64. Interposed between the plate 62 and the presser plate 64 are helical springs 65 which are coiled about the cap screws and yieldably urge the presser plate outwardly. Under normal conditions, the presser plate 64 assumes a position within a gap 65 in the inner wall section 40 and out of the path of the packages travelling past said plate. Carried by the follower bar 61 is a follower roller 66 which bears against the periphery of a cam disc 67. The disc is mounted upon the cam shaft 57, the periphery of the disc comprises a concentric cam dwell surface 68 and a concentric dwell surface 69 of lesser radial length. Thus for a portion of one rotation of the cam disc 67, the follower bar is forced outwardly toward the conveyor chain runway as determined by the dwell portion 68 of the cam and will be retracted during the interval as determined by the dwell portion 69 of the cam. The retraction is effected by an expansion spring 70 mounted upon a shaft 71.

Figure 12:
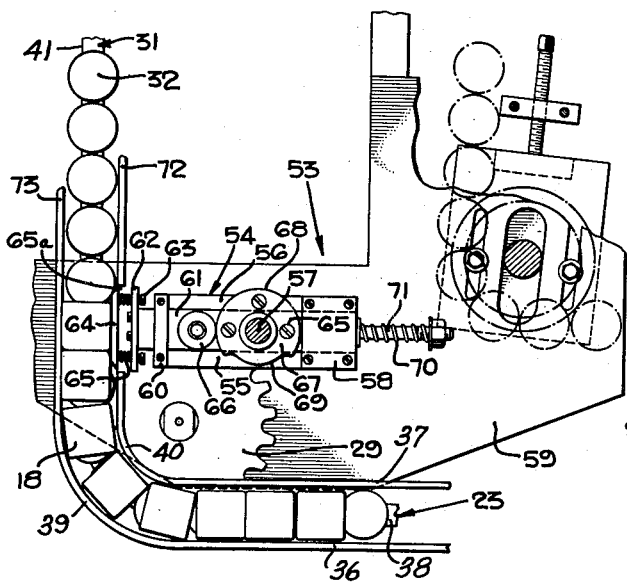
Fig. 12 is an enlarged detail sectional view taken on the line 12—12 of Fig. 4 and illustrates a mechanism for periodically halting the flow of cartons carried along the feed conveyor.
Figure 21:
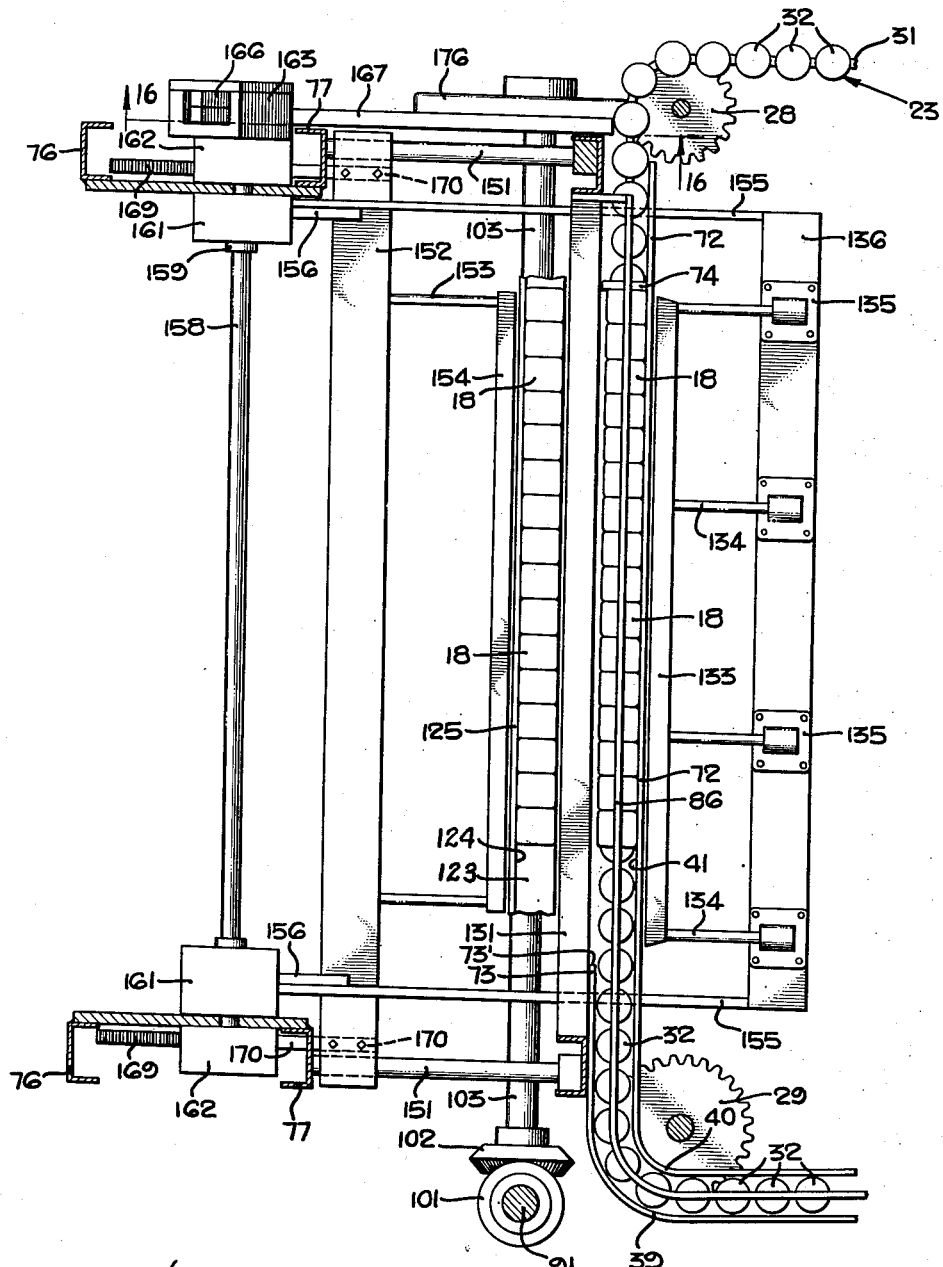
Fig. 21 is an enlarged fragmentary diagrammatic horizontal sectional view taken on the line 12—12 of Fig. 4 and illustrates the cam actuated pitman drive for the carton feed mechanism.

By referring particularly to Fig. 12, it will be seen that the presser plate 64 will be moved outwardly and across the path of travel of a run of packages 18 and will be held in this position as the conveyor chain 31 continues to move beneath the packages 18 resting thereon. As explained previously, the conveyor chain 23 is provided with circular discs 32 on their upper lengths. These discs are smooth and under normal circumstances engage the bottom surfaces of the packages with sufficient friction to cause the packages to be carried along the runways in the normal course of transit through the machine. However, when the presser bar 64 positively engages one of the packages it will force that package outwardly and against the outer rail of the runway and hold the package against movement to provide an obstruction for a run of packages which are being carried forwardly by the conveyor chain 23. Due to the fact that the conveyor chain 23 only engages the package frictionally, the chain will proceed as driven while allowing the obstructed package to be held as shown in Fig. 12 and insuring that the oncoming packages will accumulate in the runway and in close proximity to each other. The contour of the cam 67 is such in the present instance as to cause the packages 18 to accumulate in the runway until sixteen of these packages have been placed side by side and face to face. The presser plate 64 then retracts to allow the sixteen packages to advance between the guide rails 72 and 73 as shown in Fig. 3 of the drawings and which guide rails comprise extensions of wall sections 39 and 40 at opposite sides of the length of conveyor chain indicated at 41 in Fig. 21 as occurring between sprockets 29 and 28. As it travels along run 41, the accumulated row of packages will encounter a stop lock 74 (Fig. 3) which positions the accumulated row of packages for a feeding operation into the hardening tunnel 42.

Timing unit

Figure 4:
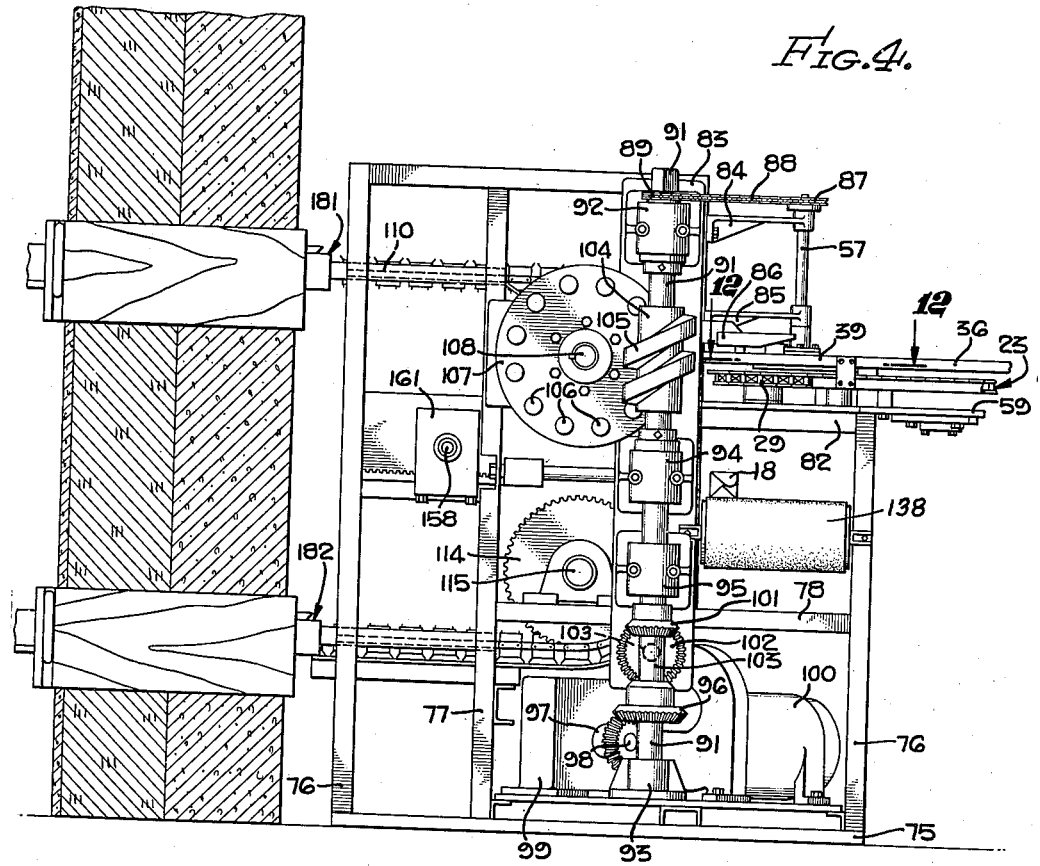
Fig. 4 is an enlarged fragmentary view as seen on the line 4—4 of Fig. 3 and illustrates the drive for the timing mechanism.

By reference to Fig. 4 of the drawings, it will be seen that the structure previously described is supported on a structural frame. This comprises a base plate 75 carrying corner uprights 76 and an intermediate upright 77. Transverse members 78 are provided as bearing supports. A horizontal element 82 is attached to the vertical element 76 and supports the plate 59. A vertical post 83 is secured to the frame structure and as indicated in Fig. 4, supports an upper bearing bracket 84. A lower bracket 85 is also supported by this post. These brackets carry aligned bearings to receive the stop cam shaft 57, as previously described. Suitably supporting the packages as they travel between the side walls 72 and 73 is a top rail 86 (Fig. 4) which acts to hold the upper flanges of the carton in their folded and closed position. The cam shaft 57 carries a sprocket 87 at its upper end (Figs. 3 and 4). This sprocket receives a sprocket chain 88 which is also led around a sprocket 89. An idler sprocket 90 (Fig. 3) bears against the chain 88 and keeps this taut. The ratio between the sprockets 87 and 89 is substantially 1–1. The sprocket 89 is mounted upon the upper end of the main drive shaft 91. The main drive shaft is particularly shown in Fig. 4 of the drawings where it will be seen that its upper end is mounted in a vertical bearing 92 and that its lower end is mounted in a bearing 93. Intermediate the ends of the drive shaft are bearings 94 and 95. The main drive shaft 91 is fitted with a mitre gear 96 near its lower end which meshes with a mitre gear 97. The latter gear is carried by a driven shaft 98 which is in driving connection with a suitable gear train enclosed within a gear box 99 and driven by a motor 100 which supplies power for the entire machine.

Figure 6:
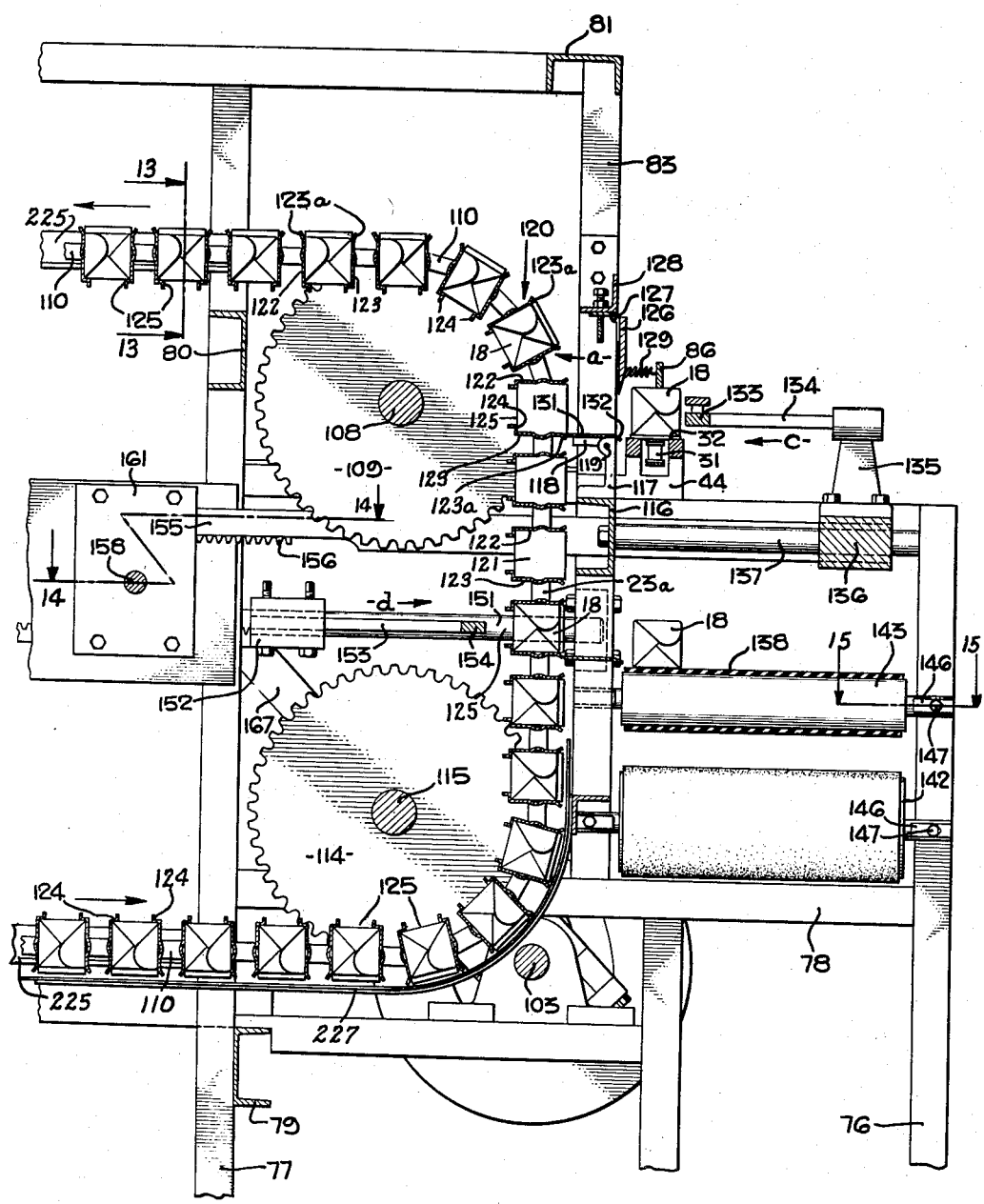
Fig. 6 is a view in vertical section as seen on the line 6—6 of Fig. 3 and shows the end of the freezing tunnel with the conveyors therein and the associated feeding structure.

The main shaft 89 is also fitted with a mitre gear 101 (Fig. 4) which is in mesh with a gear 102, the latter being mounted upon a drive countershaft 103 (Fig. 21) which extends horizontally and is supported in suitable bearings on the main frame. Above the bearing 94 a worm cam 104 (Fig. 4) is mounted on the shaft 91. The worm cam is formed with a thread 105 which is engaged by follower rollers 106 mounted upon a circular disc 107 (Fig. 4) keyed to a conveyor drive shaft 108. The pitch of the worm cam and the spacing of the follower cam rollers 106 are such as to insure that the disc 107 will operate intermittently to drive the shaft 108 which carries a conveyor chain sprocket 109 as shown in Fig. 6 of the drawing. The sprocket 109 receives the conveyor chain 110 which leads to the hardening tunnel 42. The conveyor chain after passing the full length of the tunnel 42 passes around a sprocket 111 (Fig. 18) at the rear end of the machine thereafter passing around an intermediate sprocket 112 and then a sprocket 113 at the rear of the machine. The sprocket chain is then led forwardly to pass around an idler sprocket 114 (Fig. 6) at the forward end of the machine. By reference to Fig. 6 of the drawing, it will thus be seen that the uppermost horizontal run of the chain 110 leads into the machine from the sprocket 109 and that the lowermost horizontal run leads out of the machine from the sprocket 114. It is to be further pointed out that the sprockets 109 and 114 are spaced from each other a sufficient distance to provide a vertical run of chain 23a, the importance of which will be hereinafter explained. The lower sprocket chain 114 is mounted upon an idler shaft 115.

Hardening tunnel conveyor

By reference to Fig. 3 of the drawing it will be seen that the side rail 72 extends straight from the curve in wall 40 to the stop lock 74. The rail 73 is relatively short and provides an open space 73' of a distance greater than the length of packages which have accumulated against the stop lock 74. Extending along the space indicated by the numeral 73' is a guide frame structure such as previously indicated and described at 44 (Fig. 10). This is channel shaped and accommodates the chain 31 while permitting the discs 32 to rest upon its upper face. The guide frame 44 is disposed adjacent to the outer side of the frame structure and a cross post 83 (Fig. 6) by which it is supported. A cross channel 116 extends horizontally between posts 83 and supports a bracket 117. This bracket is of channel shape and carries a plate 118 pivoted to the bracket by a pin 119.

Figure 13:
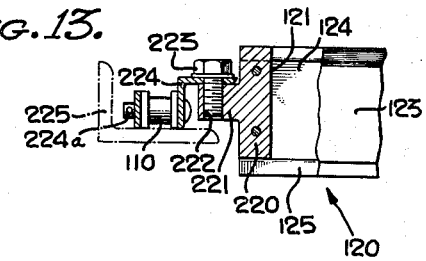
Fig. 13 is an enlarged fragmentary detail sectional view taken on the line 13—13 of Fig. 6 and illustrates a chain mounting for a conveyor bucket.
Figure 17:
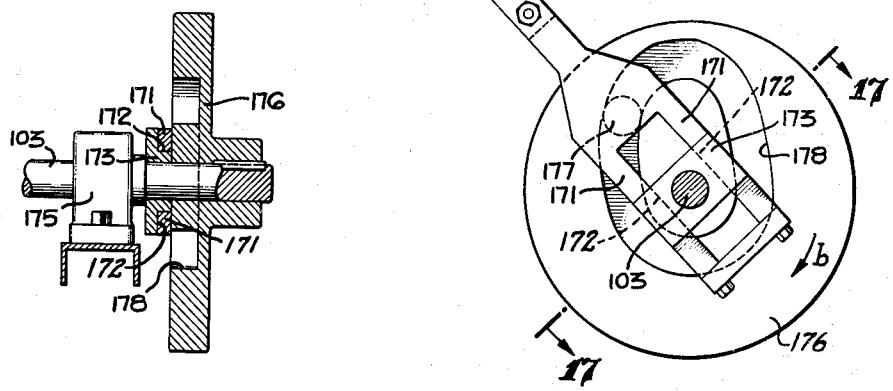
Fig. 17 is a cross sectional view taken on the line 17—17 of Fig. 16.

The sprocket chain 110 carries transversely disposed buckets 120 (Figs. 6 and 13), each of which are here shown, accommodate sixteen packages in a row and deliver these packages into, through, and away from the freezing or hardening tunnel 42. The buckets are formed with opposite end walls 121, and parallel sidewalls 122 and 123, said sidewalls having bottom edge flanges 124. The end walls are fixed to the lengths of the chain so that when the buckets are passing along the vertical chain run 23a and the packages are to be transferred from the frame 44 and into the buckets, the packages will be upright this insuring that the bottom of the cartons will rest upon the sidewall 123 of the bucket and the cover portion of the carton will register with the sidewall 122 thus insuring that while the closed carton is within a bucket, it will be held closed even though during transit through the freezing tunnel the packages will assume upright positions with the packages at times lying on their sides and in other positions in which the packages are entirely inverted. As shown in Figs. 6 and 13, the space between bottom flanges 124 of each bucket 120 forms an opening 125 to accommodate pusher bars, to be described hereinafter which are used to eject the cartons from the buckets.

Referring to Fig. 6, a hinge plate 126 is pivoted at 127 to a structural element 128 carried by the vertical posts 83. This plate is free to swing inwardly, as indicated by the arrow *a* in Fig. 6 and is yieldably held at its free end by a spring 129 which is secured to overhead rail 86. The closed packages 18 pass beneath the rail 86 and since the folded cover flaps are uppermost, this rail holds the package in its closed position. The plate 126 will act as a wiper plate while the packages are in transit from the guide frame 44 to a bucket 120, in horizontal register therewith and is of a length to accommodate the row of packages allowed to accumulate on the guide frame 44.

Secured across the top face of the pivot plate 118 is a transit plate 131 which has a downturned outer lip at 132 over which packages 18 may be moved. The opposite edge of the plate 131 overhangs the plate 118 and may move into overlapping relation with a flange 123a carried on the outer edges of the sidewalls 122 and 123. This insures that the carton will be brought to register and will properly seat within one of the buckets 120.

Transfer from timing conveyor to hardening conveyor

Figure 5:
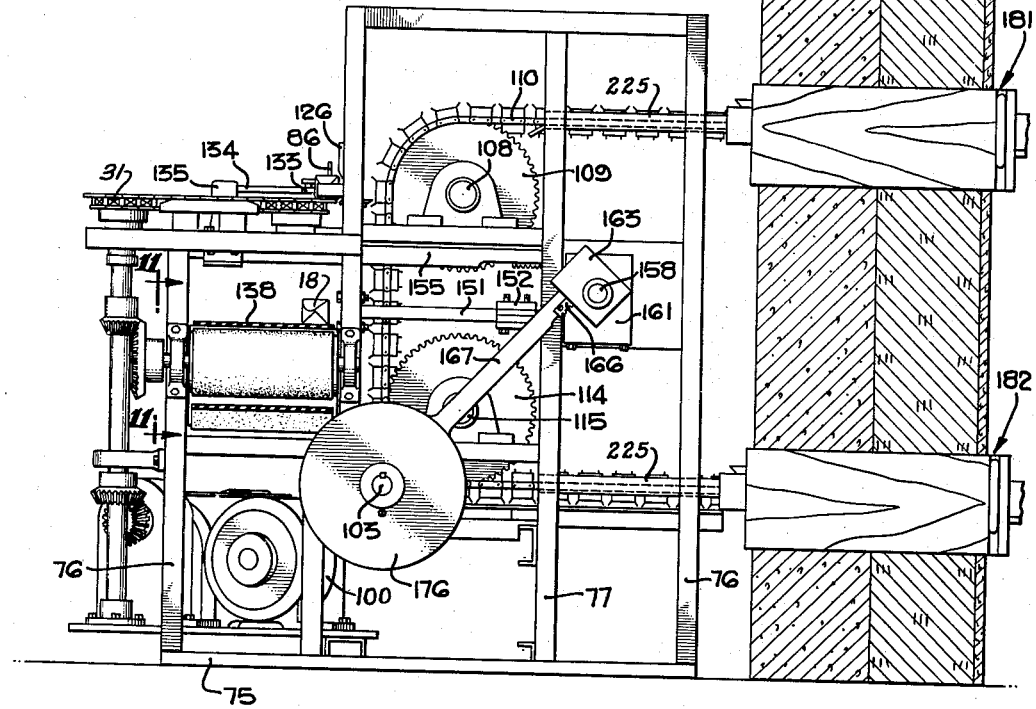
Fig. 5 is a view in section and elevation as seen on the line 5—5 of Fig. 3 and shows the interrelation of the timing and conveying mechanism.

In order to automatically transfer a group of packages from the guide frame 44 and into a bucket 120 carried by the chain 110, automatic means are provided. These include a push bar 133 carried by a series of auxiliary bar supporting arms 134 (Figs. 5 and 6). These arms are held parallel to each other in a common horizontal plane and by brackets 135. These brackets are fixed upon an impeller cross bar 136 which is horizontal and is parallel to the push bars 133. The impeller cross head 136 is mounted for movement in a horizontal plane upon slide bars 137 (Fig. 6). These guides are secured horizontally between the vertical frame members and make it possible for the entire impeller structure to move back and forth in pushing an accumulated group of packages into a bucket 120 of the conveyor chain 110 and withdrawing from this operation.

Figure 11:
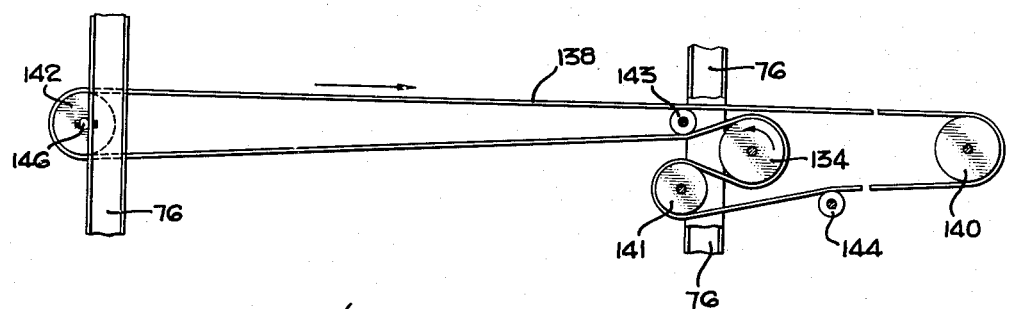
Fig. 11 is a view on the line 11—11 of Fig. 5 and shows the arrangement of the carton discharge conveyor belt.
Figure 15:
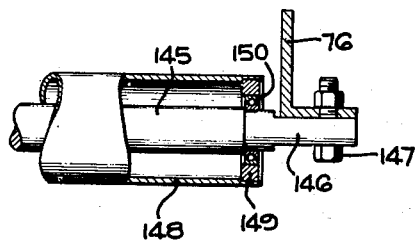
Fig. 15 is a fragmentary view in horizontal section as seen on the line 15—15 of Fig. 6 and shows the pulley mounting for the carton discharge conveyor.

As shown in Fig. 6 of the drawing, the machine is equipped with a unit which propels an accumulated group of packages into a bucket 120 or expels a group of packages from a bucket 120 which has just completed a cycle through the hardening tunnel 42. The expeller structure moves packages 18 onto a belt conveyor (Fig. 11) 138 which is supported by the main frame. The belt conveyor is led around a plurality of rollers 139, 140, 141 and 142, idler rollers 143 and 144 being also provided. These rollers are of the detailed construction shown particularly in Fig. 15 of the drawing, a mandrel 145 being provided for each roller. These mandrels have flattened end portions 146 to receive bolts 147 by which their ends may be secured to the frame. The rollers are tubular and hollow as defined by a cylindrical wall 148. At each of the opposite ends of the roller a filler disc 149 is supplied to provide a mounting for an anti-friction bearing 150. It will be seen by this structure that the rollers may be easily mounted in position and replaced when required.

As previously stated, it is necessary to provide automatic means to introduce a collected group of packages into a conveyor bucket 120 and to expel a group of packages from a bucket which has just completed a cycle through the hardening tunnel. In order to accomplish the latter function, slide bars 151 (Fig. 6) are supported horizontally upon the frame structure of the machine. The bars 151 are similar in construction and function to the bars 137 previously described as employed in connection with the carton propelling device. The bars 151 slidably carry an expeller cross head 152 upon which is mounted a plurality of auxiliary expeller bar supports 153 and an expeller bar 154 which is carried at the free end of said supports. The expeller bar 154 may pass into the openings 125 in the buckets 120.

Figure 14:
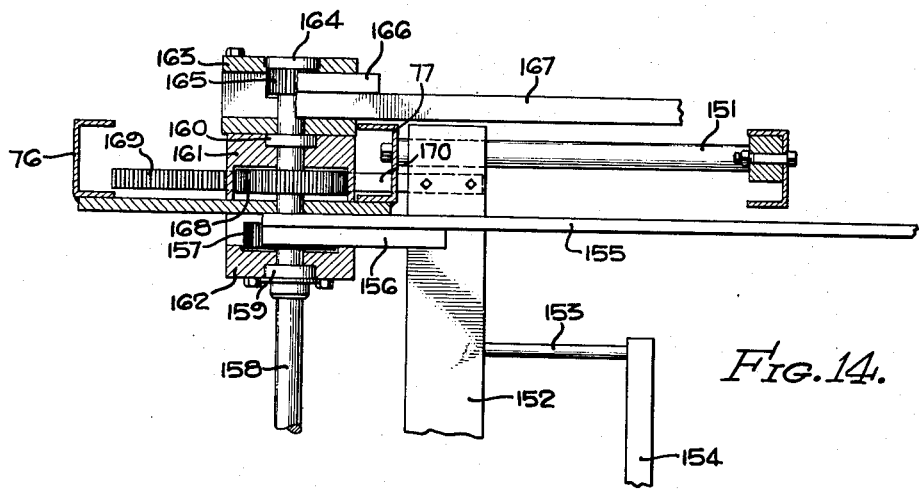
Fig. 14 is an enlarged fragmentary horizontal sectional view taken on the line 14—14 of Fig. 6 and illustrates a means for driving the carton propeller and expeller mechanism.

The impeller cross bar 136 is firmly secured to an impeller rack bar 155 which extends horizontally and carries a gear rack 156 as shown in Fig. 14 of the drawings. The gear rack 156 overhangs and is in mesh with a pinion 157 which is carried upon a drive shaft 158. The shaft 158 is fitted with anti-friction bearings 159 and 160 which are mounted in an impeller gear box 161 and an expeller gear box 162 respectively. The outer end of the drive shaft 158 is fitted with a drive gear box 163 carrying an anti-friction bearing 164 within which the shaft 158 is rotatably supported. The outer end of the shaft 158 carries the driving pinion 165 against which a pitman rod gear rack 166 rests and with which it meshes. The gear rack 166 is disposed along the end face of a pitman rod 167, the operation of which will be hereinafter described.

Referring again to Fig. 14 of the drawing, the expeller gear box 162 is shown as fitted with an expeller gear 168 which is keyed onto the shaft 158. In mesh with the gear 168 is an expeller rack 169 which is carried upon an expeller bar 170. The impeller bar 155 and the expeller bar 170 are disposed upon opposite sides of the longitudinal axis of the shaft 158 and in parallel relation to each other. Thus, as the shaft 158 rotates in a given direction the bars 155 and 170 move simultaneously in opposite directions and cause the propeller cross head 136 and the expeller cross head 152 to move in opposite directions, one simultaneously advancing a push bar and the other simultaneously retracting a push bar. It is to be understood that the drive shaft 158 is fitted at its opposite ends with gear boxes 161 and 162 but that a drive gear box 163 is only fitted on one end of the shaft 158 since only one pitman rod 167 is necessary for driving the shaft 158.

Figure 16:
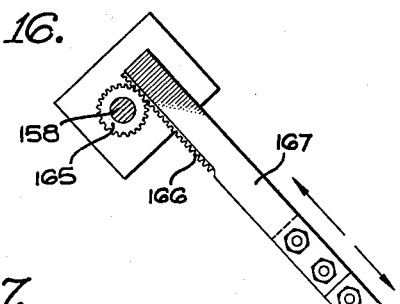
Fig. 16 is an enlarged fragmentary vertical sectional detail view taken on the line 16—16 of Fig. 21 and illustrates the cam and pitman rod drive for the propeller and expeller mechanism.

The drive gear 165 of the shaft 158 is provided to be rotated by the gear rack 166 when the pitman rod 167 is driven. The pitman rod as shown in Fig. 16 has a straight length and a bifurcated end formed with parallel arms 171. These arms extend along runways 172 formed in opposite edges of a bearing block 173. The bearing block 173 is mounted upon the horizontal cam shaft 103 and is disposed between a fixed bearing 175 and the end face of a disc-shaped face cam 176. The arms 171 thus provide a cam yoke which carries a follower cam roll 177 which extends into a cam groove 178. The cam groove is formed on the flat face of the cam disc 176, the face being normal to the axis of the disc. The cam groove is substantially elliptical in shape and thus insures that the pitman rod 167 will be reciprocated as the cam disc 176 rotates with the shaft 103. By this movement, the shaft 158 will be caused to rotate a given distance in one direction and then to rotate a given distance in the opposite direction so that the push bars 133 and 154 may move simultaneously to force one group of packages 18 into one bucket 120 and force another group of packages 18 out of another bucket 120 and onto the conveyor belt 138.

*Hardening tunnel*

It is to be understood that the cartons forming the packages 18 are filled with semi-solid ice cream or other material which is to be refrigerated and that the groups of cartons 18 are to be carried through the hardening tunnel 42 during which time the packages 18 are subjected to a refrigeration action both by conduction and convection of low temperature air. In order to carry the cartons through the hardening tunnel 42, and to insure that proper refrigeration takes place, the timing portion of the structure is provided as generally indicated at 22 in Fig. 20 of the drawing, this being enclosed within a suitable housing 179 as indicated in Figs. 1 and 2 of the drawing. The hardening tunnel 42 is separated from the housing of the timing unit 22 by a partition wall 180 which is preferably to provide a heat insulating barrier between the space occupied by the timing unit 22 and the hardening tunnel 42. Parallel transfer passageways 181 and 182 extend through the barrier 180 and accommodate the conveyor chain 110 by which the packages 18 are delivered into the hardening tunnel 42 and are delivered from the tunnel 42.

*Defroster*

Figure 8:
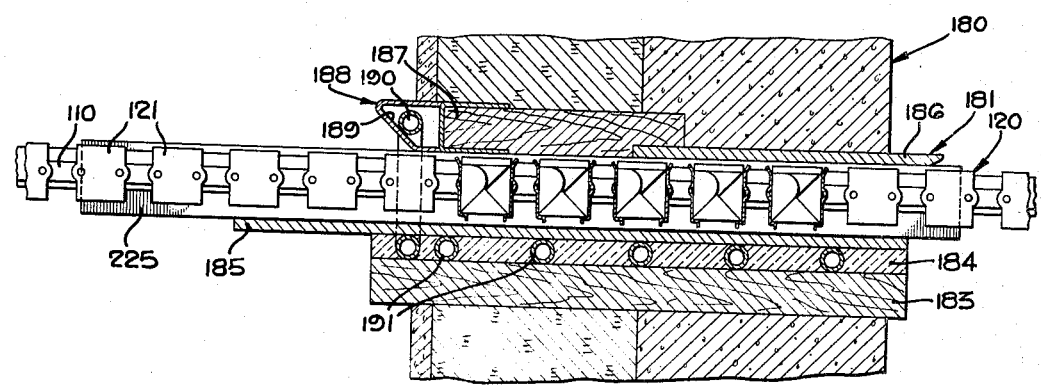
Fig. 8 is an enlarged view in vertical section as seen on the line 8—8 of Fig. 3 and shows the defrosting unit embodied in the main wall of the freezing tunnel and acting to remove frost from the conveyor chain at the point where the chain passes through the wall.

In practice the difference in temperature between the atmosphere on opposite sides of the barrier 180 is such as to cause a frosting action to take place in the air which passes through transfer passageways 181 and 182. This action may be sufficient to cause the moisture laden air to deposit frost which would act to close the transfer passageways or freeze the conveyor chain and its buckets within the transfer passageways so that the machine would have difficulty in starting. This action may take place at night when the machine is shut down. In order to eliminate this hazard the transfer passageways 181 and 182 are constructed as shown particularly in Fig. 8. Here it will be seen that the barrier 180 is formed with an opening, the lower side of which is lined with wooden timbers as indicated at 183. These timbers lie flat across the bottom face of the opening and provide a support for a layer 184 preferably made of fibre glass or other suitable heat insulating material. Disposed above the layer 184 is a horizontal wear plate 185 over which the conveyor chain 110 and its buckets 120 pass. Disposed in the opening through the barrier and above the chain is a wear plate 186 which extends forwardly through the opening and beyond the vertical face of the barrier 180. At the rear of the wear plate 186 and in the opening within the barrier is a timber 187 which partially lines the upper face of the opening and carries a defrosting element 188. This element is carried on the timber 187 and has a transversely extending compartment 189 to which steam is delivered. The compartment also communicates with a pipe 190 which extends downwardly and then horizontally in the form of a sinuous coil 191 imbedded within the layer of heat insulating material 184. By this arrangement it will be seen that a defrosting unit is provided to prevent the passageways 181 and 182 from clogging or freezing.

*Refrigeration unit*

Figure 7:
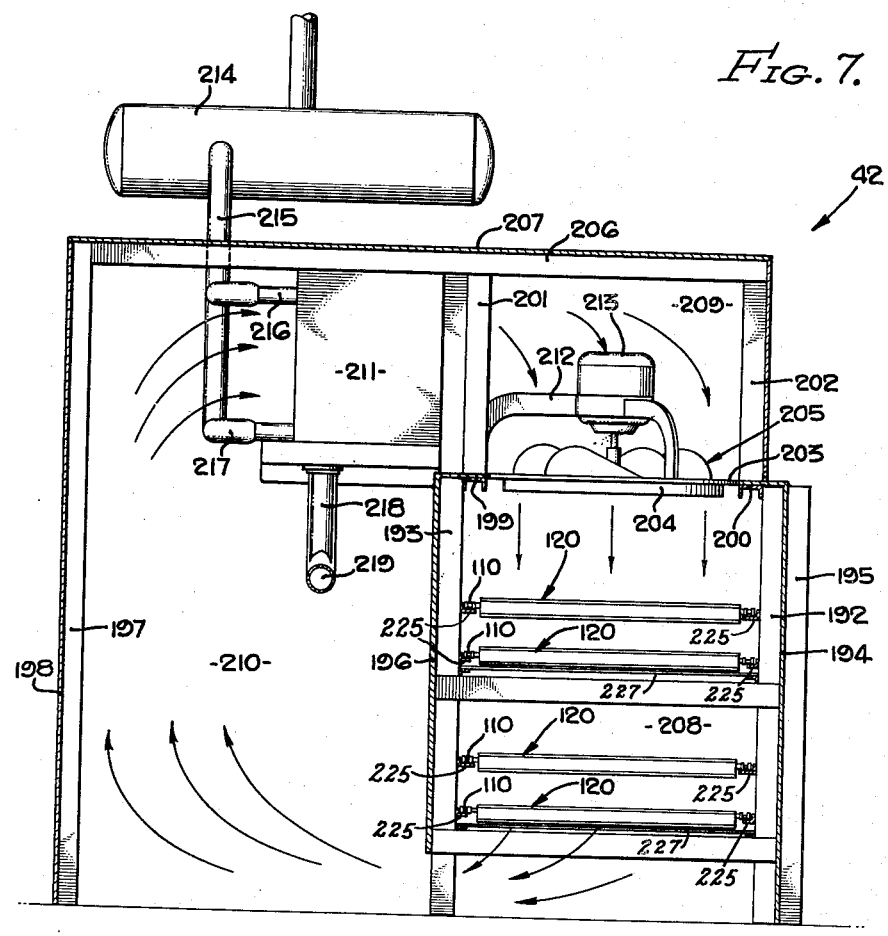
Fig. 7 is a view in vertical section through the freezing tunnel as seen on the line 7—7 of Fig. 2 and shows one of the cooling units and the multiple run of conveyor within the tunnel.

The double conveyor chain 110, as previously stated, carries the packages 18 into the hardening tunnel generally indicated at 42. This tunnel is formed with vertical uprights 192 and 193 (Figs. 1, 2 and 7). The uprights 192 carry a sheet metal sidewall 194 which is given rigidity by vertical outside channel elements 195. Spaced from the outer sidewall 194 is a sidewall 196 (Fig. 7) which is supported by the vertical uprights 193. Spaced from the uprights 193 are uprights 197 (Fig. 7) which carry a sheet metal sidewall 198. A pair of horizontal frame bars 199 and 200 (Fig. 7) are secured, in place, the latter on the upper ends of the uprights 192 and the former on uprights 193 at a distance from the upper end thereof. Mounted upon the horizontal frame bars 199 and 200 are vertical frame bars 201 and 202. A floor 203 is supported by the frame bars 199 and 200 and is formed with circular openings 204 each of which accommodates a fan-type blower 205. Mounted upon the top of the tunnel frame structure are transverse beams 206 which are secured to the upper ends of frame elements 202 and frame uprights 198. The transverse beams 206 support a sheet metal sealing plate 207 which combines with the sheet metal plates 194, 196, 198 and 203 in order to provide in the refrigerating tunnel 42 a transit tunnel 208, a fan compartment 209, and an air circulating passageway 210 (Fig. 7). The circulating passageway 210 is fitted with a refrigerating coil unit 211 through which air passes as it is drawn from the circulating passageway to the fan compartment 209 and delivered to the transit tunnel 208. Within the fan tunnel are a series of fans previously indicated at 205. These are unit structures each of which include a frame 212 which carries a fan driving motor 213. These fan units are distributed at uniform distances throughout the length of the refrigerating tunnel 42, as shown in Fig. 1 of the drawing, and receive cooled air from the refrigerating coil units 211 which units are spaced along the fan tunnel and freely communicate therewith. As shown in Fig. 7 each of the refrigerating units 211 communicates with an ammonia holding tank 214 through a manifold pipe 215 having outlet pipes 216 and 217. The drain pan of each of the refrigerating coil units is fitted with a drain pipe 218 and a defrosting overflow pipe 219.

The transit tunnel 208 is designed for the purpose of accommodating the conveyor chain 110 and the buckets 120 carried thereby. Each of the end walls 121 of each bucket 120 is secured to the sidewalls 122 and 123 thereof by rivets 220, and has an outwardly projecting lug 221, the latter having a vertical tapped hole 222. This hole receives a cap screw 223 which secures said lug to one of an endless series of angle plates 224 provided on corresponding links of the double conveyor chain 110.

As shown in Figs. 7 and 13, the double chain 110 travels along spaced angle rails 225 which are supported on the frame of the tunnel structure and the wall 180 through which said rails extend.

Figure 19:
Fig. 19 is an enlarged fragmentary view in plan and is taken on the line 19—19 of Fig. 18 and shows details of the conveyor chain structure and the perforate partitions located therebeneath.

It will be seen that the chain is rove around the sprockets so that there will be four substantially horizontal runs of the chain within the transit tunnel 208 as indicated at 110a, 110b, 110c, and 110d. By tracing the chain 110 through the transit tunnel it will be evident that while the buckets 120 are being conveyed along the runs 110b and 110d the buckets will be overturned. In order to prevent this causing the packages 18 to fall from the buckets, perforate partitions 227 are provided close beneath the packages carried by the double chain 110 in its runs 110b and 110d as shown in Fig. 19. These partitions support the packages 18 and allow free circulation of air through the partitions and also through and around the buckets 120.

Figure 18:
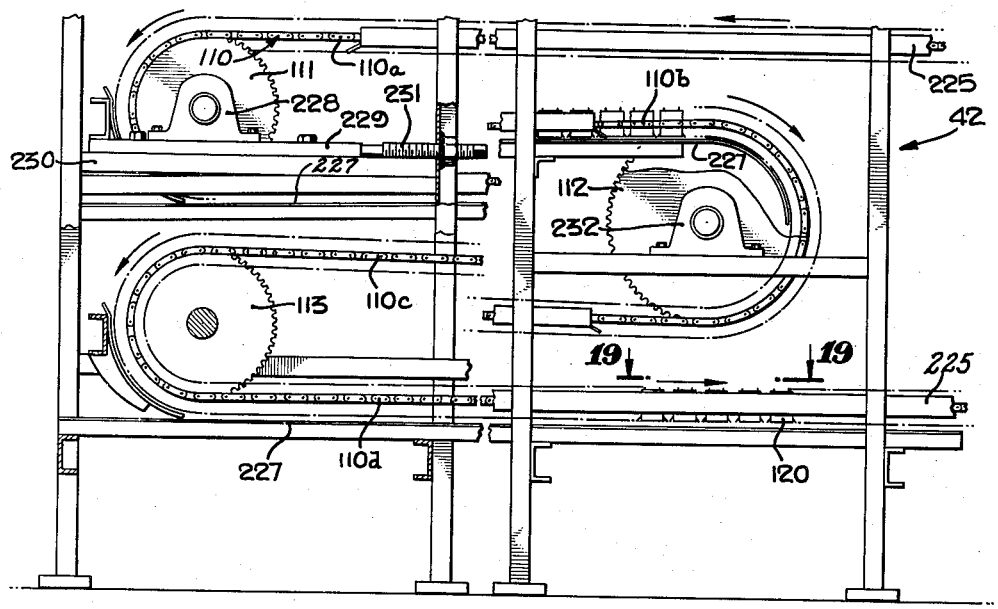
Fig. 18 is a fragmentary view in vertical section as seen on the line 18—18 of Fig. 1 and shows the arrangement of the conveyor chains within the freezing tunnel.

In order to insure that the double conveyor chain 110 is maintained taut at all times a pair of the conveyor chain sprockets is mounted to provide a chain pickup. In Fig. 18 of the drawing sprocket 111 is indicated as being thus mounted. It is fitted with a bearing 228 which is carried on a sliding plate 229. This plate rests upon a support plate 230 and may be forced toward a tensioning position by a screw 231 threaded through one of the uprights of the tunnel. The shafts of the other sprockets are of course provided with fixed bearings as indicated at 232 in Fig. 18 of the drawings.

*Operation of machine*

In operating the present invention it will be understood that the apparatus is disclosed as being used in hardening ice cream in cartons although the present invention may also be used for refrigerating other types of food products if desired.

Referring more particularly to Fig. 20 of the drawing, 10 indicates an ice cream freezer within which desired ingredients are placed for the mixing and making of ice cream. The mixed material is then delivered to a pump 11 and forced through a conduit 13 to a measuring and filling mechanism as generally indicated by the numeral 15 in the drawing. The ice cream mix in a semi-solid state is forced through the conduit 13 and the two distributing heads 14 from which measured quantities of ice cream are discharged into cartons which when filled and closed are indicated by the numeral 18. Cartons as shown in Fig. 3 of the drawings are delivered from four conveyors generally indicated at 16 and onto complementary carton runways 19. These runways simultaneously conduct packages 18 to the endless chain conveyor unit 23. This conveyor unit is a part of the timing mechanism indicated at 22 in Fig. 20 and other figures of the drawings. The packages 18 rest by gravity on the discs 32 of the chain and are carried around and along the guide walls at opposite sides of the chain. When the flow of packages 18 is interrupted by the presser 64 of the mechanism associated therewith as shown in Fig. 12 of the drawings the cartons will tend to "stack up" between the guide walls 36 and 37 until in this case sixteen packages have been accumulated in a side to side position of alignment. The cam 67 will then retract the presser plate 64 and will permit the sixteen cartons to travel into an aligned position between the guide rails 72 and 73 and against the lock stop 74.

It will be understood that when desired the lock stop may be moved so that it will not be interposed in the path of travel of the packages and will allow the packages to be discharged from the machine in an emergency operation and to be passed out between the guide walls 72 and 73.

The cam 67 is driven by the shaft 57 which carries a sprocket 87 around which the driving chain 88 is led (Figs. 3 and 4). It will be understood that the sprocket 88 also passes around the chain 89 which is carried upon the upper end of the main drive shaft 91. The main drive shaft, as previously explained, is driven by the motor 100 through the gear box 99 and the gears 97 and 96 (Fig. 4).

By reference to Fig. 12 of the drawing it will be seen that there is a dwell 68 upon the cam 77 which will determine the amount of time during which the forward feed of the packages 18 on the conveyor chain 31 is interrupted. During this time it is understood that the accumulated number of packages (sixteen in the present case) shall be transferred from the chain 31 and into one of the buckets 120 of the double chain 110. At the time of this transfer, a row of packages 18 is in a horizontally aligned position with a bucket 120 as shown in Fig. 6 of the drawing and it is intended to shift the row of packages from their position upon the discs 32 of the chain 31 as it stands idle between the rails of the guide member 41 and across the plate 108 into the bucket 120 in alignment therewith as shown in Fig. 6. This is accomplished by the continuous driving movement of the cam plate 176 as it rotates in the direction of the arrow b as indicated in Fig. 16 of the drawing. This will cause the follower 177 which is mounted on the pitman rod 167 to pass along the face of the cam groove 178 as the yoke 171 reciprocates. The pitman rod will also reciprocate so that a partial rotation of the propeller and expeller drive shaft 158 will be effected. This will partially rotate the propeller gear 157 and the expeller gear 168 with the result that the propeller gear rack 156 and the expeller gear rack 166 (Fig. 14) will oppositely and simultaneously reciprocate. When this takes place the propeller cross head 136 will move inwardly in the direction of the arrow c in Fig. 6 and simultaneously the expeller cross head 152 will move outwardly in the direction of the arrow d. As has been previously explained, the propeller cross head 136 moves a pusher cross head 133 and the expeller bar 152 moves a pusher bar 154. The movement of the propeller cross head 136 will then force a row of packages 18 into a bucket 120 and movement of the expeller cross head 152 will force a row of packages 18 from a bucket 120 disposed at the third level below that of the loading level. The packages 18 removed from the bucket 120 at the discharge level are delivered onto conveyor belt 138 by which they are then carried from the machine to a table upon which the packages 18 may be packed into cartons carrying a plurality of buckets.

It will be understood that the principal purpose of this machine is to harden the contents of the cartons rapidly and uniformly. This not only is a factor in maintaining the packages in a desirable condition during transit and during the storage period prior to retail sales but it is also desirable in order to maintain a uniform texture of ice cream in the packages and a uniform flavor. Thus, the present machine includes a hardening tunnel 42 to which successive rows of packaged ice cream 18 are delivered in the buckets 120 and along the path of transit as shown in Figs. 2, 6 and 18 of the drawings. The packaged ice cream is carried into the hardening tunnel 42 and is subjected to a cooling action produced by the low temperature resulting from the coils 211 and the blowers 205.

Attention is directed to the fact that the hardening or refrigerating action in the present case may be produced in two ways—one is by the circulation of cold air through the coils 211 to and through the blower 205 and thence around the packages 18 as they rest upon the run of the conveyor chain as they are carried in the buckets along the conveyor chains 110 or rest upon the perforate partition sheets 227 shown in Fig. 19 of the drawing. At the same time the metallic parts within the hardening tunnel will be reduced in temperature due to conduction and it has been found that the combined refrigeration action by convection and conduction results in the core of the mass of ice cream within the package being reduced to the desired low temperature while the surrounding mass is of uniform temperature and is not frozen to a point of excessive hardness nor in such a manner as to produce ice crystals therein. This insures that the taste of the product will be maintained as desired and that the texture of the product may be established uniformly and will be maintained in a satisfactory condition for shipping or merchandising. After the packages 18 have been hardened as herein described they are carried out through the lower passageway 182 in the partition wall 180 and are then moved from the buckets 120 at the discharge level and onto the discharge conveyor belt 138.

It will thus be seen that the method for continuously refrigerating a product and for packaging the same as there shown provides efficient means for handling food products of any character and for insuring that they may be rapidly refrigerated to a desired temperature and texture in a fully automatic operation.

While we have shown the preferred method of performing our invention and a preferred apparatus to be used in practicing the same, it is to be understood that various changes might be made in the steps of the method and that changes may be made in the combination, construction and arrangement of parts or steps in the method by those skilled in the art without departing from the spirit of the invention as claimed.

Having thus described our invention, what we claim and desire to secure by Letters Patent is:

1. A refrigerating apparatus comprising: an endless conveyor having a pair of endless spaced conveyor chains; an endless series of transversely disposed buckets each of which is supported at its opposite ends at corresponding points on said chains, each of said buckets including a pair of walls spaced longitudinally along said chains to provide a conveying and refrigerating chamber in said bucket; out-turned lips provided along outer edges of said walls; inturned flanges provided along inner edges of said walls, said lips guiding cartons into said chamber and said flanges halting said cartons when uniformly extended into said chamber; refrigerating means enclosing a major portion of said conveyor for refrigerating ice cream packed in cartons loaded in said buckets; means operating where said conveyor travels outside of said refrigerating means to successively assemble and press rows of cartons into said buckets as the latter pass a given point; and means operating to engage and expel rows of cartons, the contents of which have been refrigerated in said refrigerating means, just before the buckets containing said rows of cartons arrive at the aforesaid point.

2. A combination as in claim 1 in which the portion of said conveyor in which said carton row feeding and expelling functions are performed travels vertically, said carton row feeding means including a feed conveyor disposed on the same level as said feeding point, said feed conveyor being adapted to assemble a row of said cartons at a time on said level, said cartons having hinge-covers and being disposed in upright position; guide means for holding said covers shut as said row of cartons is assembled on said feed conveyor; pusher means for pushing said row of cartons thus assembled into a refrigerating conveyor bucket disposed at said level; and means for holding closed the covers of said row of cartons as the latter is transferred by said pusher from said feeder conveyor into said bucket.

3. A combination as in claim 2 in which said carton row assembling conveyor is spaced horizontally from a refrigerating conveyor bucket located on said feeding level; and a transit plate disposed between said bucket and said feed conveyor for supporting a row of cartons being pushed from said conveyor toward and into said bucket.

4. A combination as in claim 3, in which said vertically disposed portion of said refrigerating conveyor rises as the latter travels about its endless path; and means for pivoting said transit plate along an axis spaced a substantial distance from a conveyor bucket on said level, the edge of said transit plate adjacent said bucket overlying an outer edge of the lower of the side walls of said bucket so as to be lifted by said bucket when the latter is rising during the feeding of a row of cartons into the conveying and refrigerating chamber thereof whereby said row is guided by said transit plate into said chamber in spite of the rising of said bucket through said feeding level.

5. A combination as in claim 4, in which said means for holding the covers of said cartons closed during the feeding of a row of the same into a given refrigerating conveyor bucket includes a hinge-plate suspended above said feed level and hanging downwardly into the path of upper portions of the cartons in a row being assembled on said feed conveyor; and a spring connected to said hinge-plate and yieldably resisting rotation of the latter by said row of cartons as the latter is fed into a bucket positioned to receive the same, the point of contact between said hinge-plate and said cartons thus lying close to said bucket whereby said hinge-plate is effective in maintaining all of the covers of said cartons closed until a substantial portion of each of the cartons in said row has been extended into said bucket, thereby assuring that said covers will remain closed by virtue of said cartons fitting snugly between the transversely spaced walls of said bucket.

6. A combination as in claim 1 in which the portion of said refrigerating conveyor in which said feeding and expelling functions are performed is disposed vertically, and in which said means for feeding and expelling rows of cartons into and from said buckets operate in horizontal planes closely spaced apart vertically, the row expelling means entering between said walls of each bucket to push a row of refrigerated cartons of ice cream out of said bucket; and means for actuating said feeding and expelling mechanisms in timed relation with the travel of said refrigerating conveyor so that each bucket thus emptied of refrigerated cartons receives a row of unrefrigerated cartons of ice cream upon said bucket moving the short distance between the carton expelling level and the carton feeding level.

References Cited in the file of this patent

UNITED STATES PATENTS

| Number | Name | Date |
|---|---|---|
| 1,637,714 | Slick | Aug. 2, 1927 |
| 1,689,099 | Applegate, Jr. | Oct. 23, 1928 |
| 1,708,664 | Danberg | Apr. 9, 1929 |
| 2,064,437 | Marasso | Dec. 15, 1936 |
| 2,081,479 | Fink | May 25, 1937 |
| 2,228,999 | Birdseye | Jan. 14, 1941 |
| 2,307,413 | Loux | Jan. 5, 1943 |
| 2,385,140 | Knowles | Sept. 18, 1945 |
| 2,402,921 | Sharpe | June 25, 1946 |
| 2,415,677 | Earp | Feb. 11, 1947 |
| 2,435,462 | Patterson | Feb. 3, 1948 |
| 2,494,027 | Anderson | Jan. 10, 1950 |
| 2,532,633 | Magnuson | Dec. 5, 1950 |
| 2,573,725 | Polk | Mar. 6, 1951 |
| 2,582,789 | Morrison | Jan. 15, 1952 |
| 2,618,131 | Magnuson | Nov. 18, 1952 |